No. 709,233. Patented Sept. 16, 1902.
S. W. MILLER.
LIQUID DISTRIBUTING OR DOSING TANK AND MECHANISM.
(Application filed Jan. 6, 1902.)
(No Model.) 4 Sheets—Sheet 1.

Witnesses:
Cail S. Crawford
Gertrude Bryce

Inventor:
Sidney W. Miller
by Poole & Brown
his Attorneys

No. 709,233. Patented Sept. 16, 1902.
S. W. MILLER.
LIQUID DISTRIBUTING OR DOSING TANK AND MECHANISM.
(Application filed Jan. 6, 1902.)
(No Model.) 4 Sheets—Sheet 2.

Witnesses:
Carl H. Crawford
Gertrude Bryce

Inventor:
Sidney W. Miller
by Poole & Brown
his Attorneys

No. 709,233. Patented Sept. 16, 1902.
S. W. MILLER.
LIQUID DISTRIBUTING OR DOSING TANK AND MECHANISM.
(Application filed Jan. 6, 1902.)
(No Model.) 4 Sheets—Sheet 3.
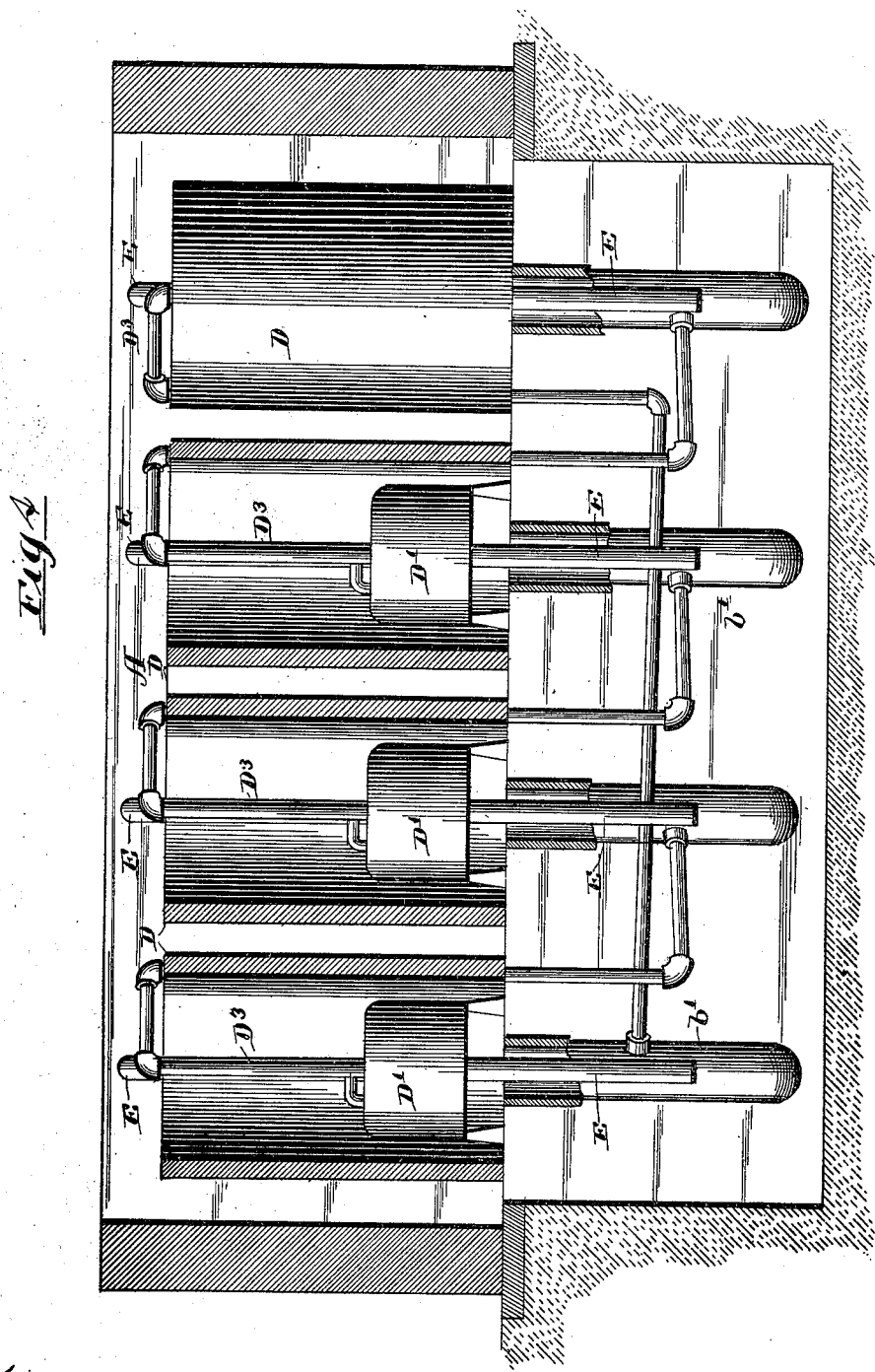

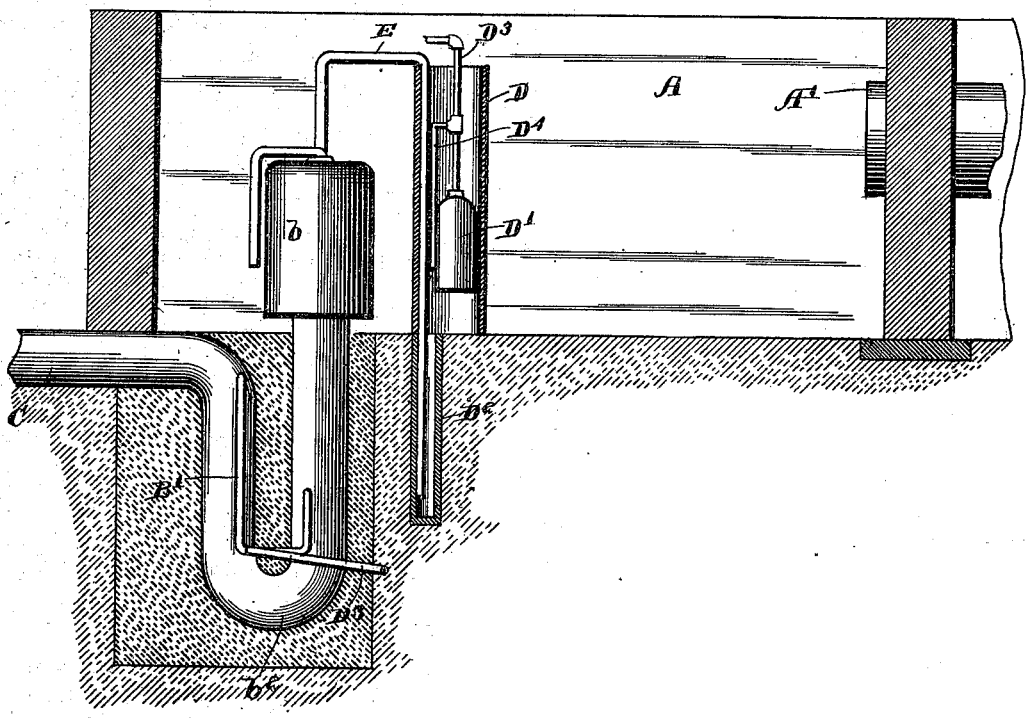

UNITED STATES PATENT OFFICE.

SIDNEY W. MILLER, OF CHICAGO, ILLINOIS.

LIQUID DISTRIBUTING OR DOSING TANK AND MECHANISM.

SPECIFICATION forming part of Letters Patent No. 709,233, dated September 16, 1902.

Application filed January 6, 1902. Serial No. 88,514. (No model.)

*To all whom it may concern:*

Be it known that I, SIDNEY W. MILLER, of Chicago, in the county of Cook and State of Illinois, have invented certain new and useful Improvements in Liquid Distributing or Dosing Tanks and Mechanism; and I do hereby declare that the following is a full, clear, and exact description thereof, reference being had to the accompanying drawings, and to the letters of reference marked thereon, which form a part of this specification.

This invention relates to an apparatus designed for intermittingly controlling the flow of liquid from a central tank or receptacle to a plurality of tanks or receptacles and so arranged that said plurality of receptacles may be filled or charged in predetermined rotative order from said main tank or receptacle.

The invention has been designed more especially for use in connection with a system for the septic treatment of sewage for purifying the same, said apparatus being adapted to be located between the septic tank and the contact or filter beds, so as to receive the sewage from the septic tank and properly distribute the same to said contact or filter beds.

The invention consists in the matters hereinafter set forth, and more particularly pointed out in the appended claims.

Figure 1:
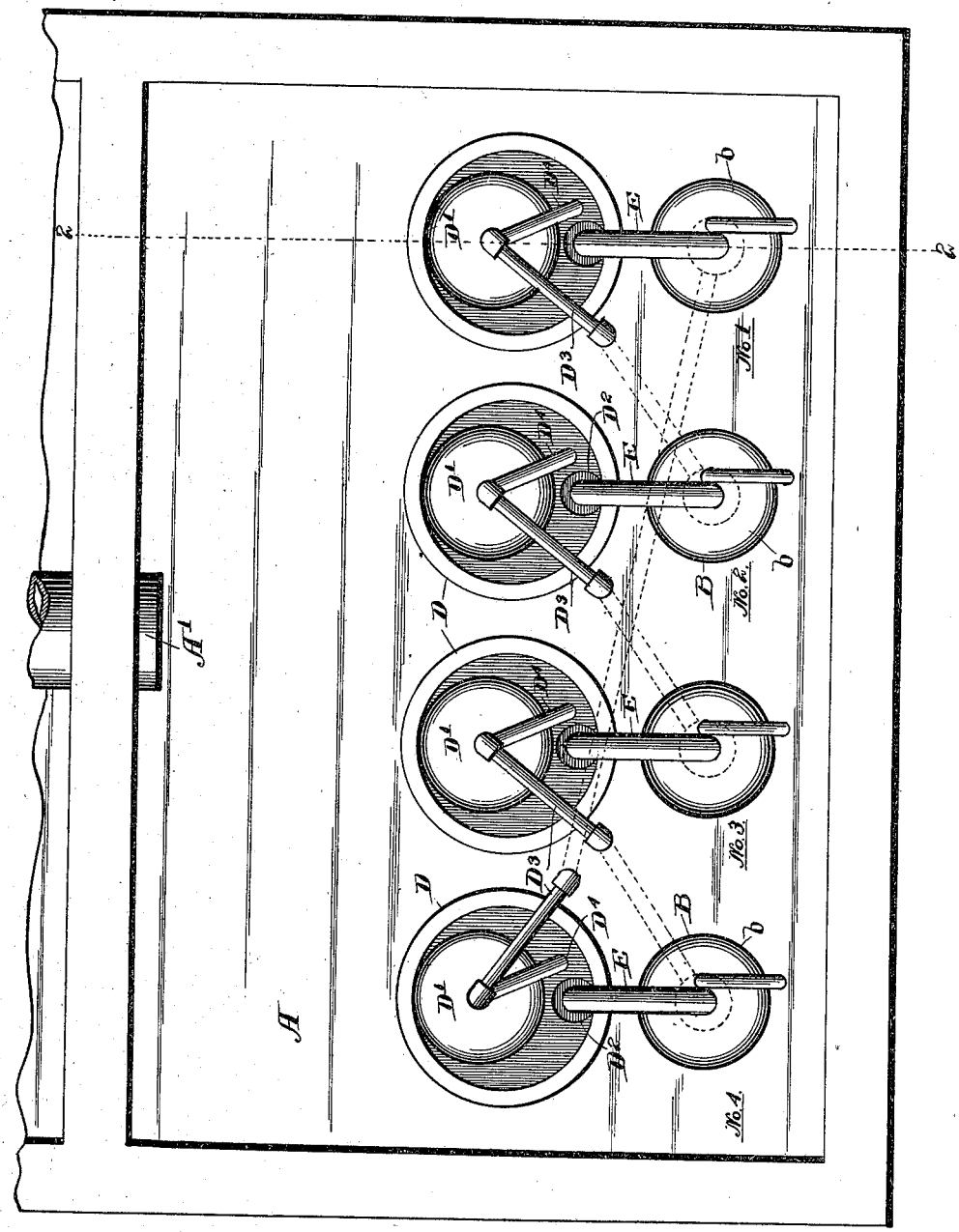
Figure 2:
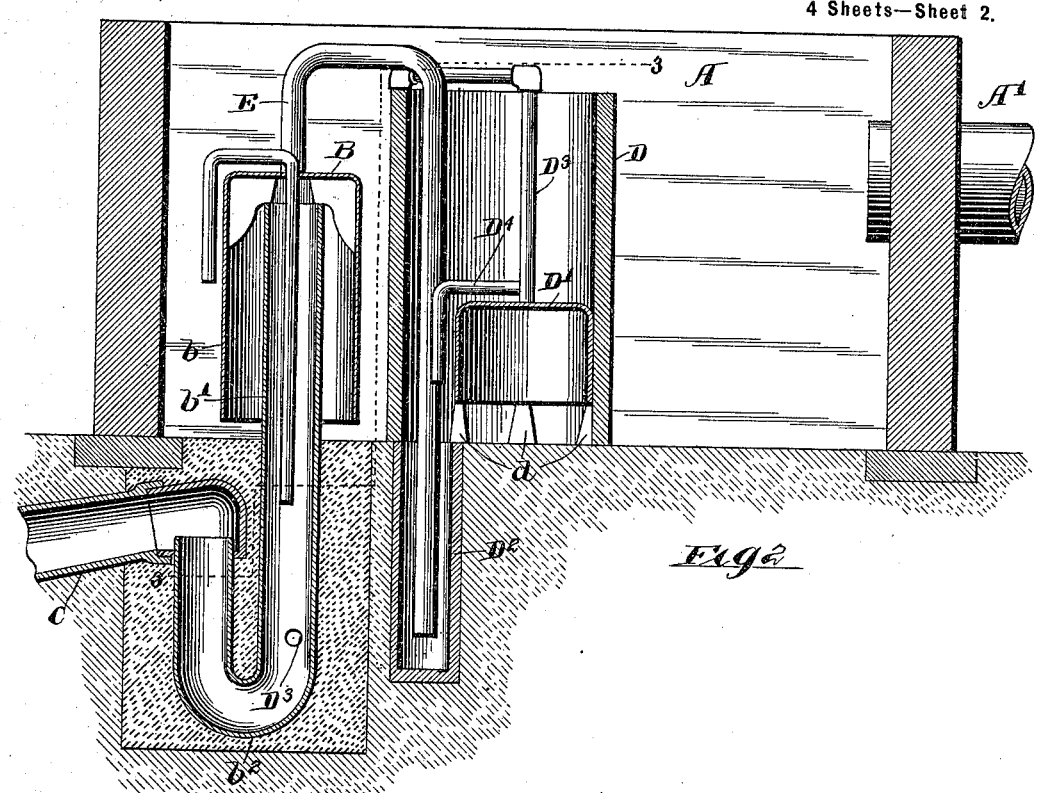
Figure 3:
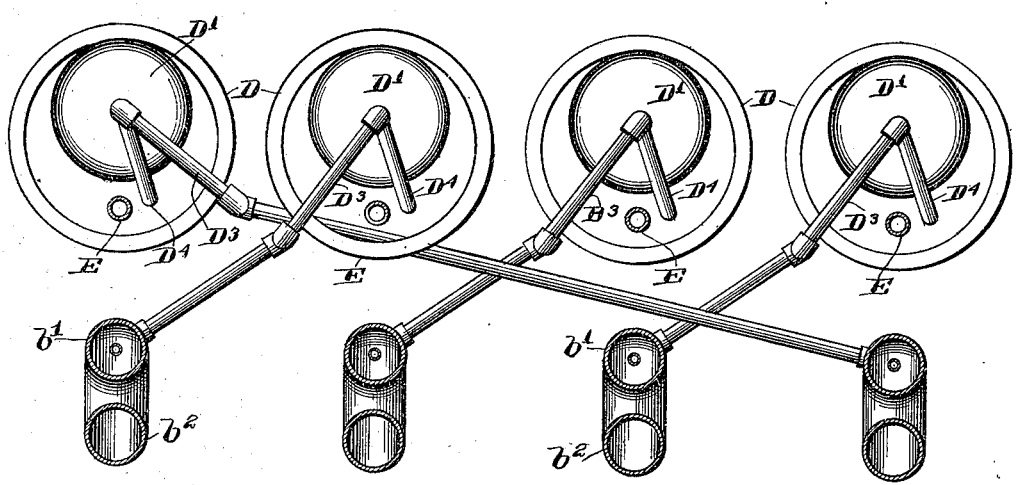

In the drawings, Figure 1 is a plan view of an apparatus embodying my invention. Fig. 2 is a transverse vertical section on line 2 2 of Fig. 1. Fig. 3 is a horizontal section taken on the indirect line 3 3 of Fig. 2. Fig. 4 is a view, partially in longitudinal section and partially in rear elevation, of the apparatus shown in Fig. 1. Fig. 5 is a vertical section of an apparatus, showing my invention applied to another form of siphon.

As shown in the drawings, A designates a tank which may be called a main "distributing" or "dosing" tank and is adapted for connection with a source supplying liquid, as a septic tank, through the medium of a pipe A'. Said tank is made of masonry or other suitable construction and when used in connection with a sewage-purifying system is made of sufficient capacity to contain a desired charge or dose of sewage to be discharged upon the several contact or filter beds connected therewith. The contents of said tank are adapted to be emptied into a plurality of receptacles, as the contact or filter beds referred to, through the medium of a plurality of siphons B, which are shown as located near one side wall of the tank. The short leg $b$ of each of said siphons consists of a downwardly-opening bell, which is supported on the upper end of the longer leg $b'$ thereof in the manner shown in Fig. 2 or other suitable manner, and said longer leg of each siphon communicates with a trap $b^2$, having an upturned portion which empties into a pipe or conduit C, leading to one of the contact or filter beds or other suitable place for the disposal of liquid discharged from said tank. Located in said tank in rear of the siphons is a series of deep chambers or wells D, equal in number to that of the siphons, and said chambers are severally associated with said siphons. Said chambers D are opened at their upper ends and closed at their lower ends. Said chambers and their associated siphons are designated on the drawings and will be hereinafter referred to as "No. 1," "No. 2," "No. 3," and "No. 4," respectively. Contained within each chamber or well D is a downwardly-opening bell-shaped receptacle D', shown as supported on short legs $d$, which rest on the bottom of said chamber, but may be otherwise supported. Said bells are made of less diameter than the chambers, as clearly shown in Fig. 1. Each siphon communicates with its associated chamber through the medium of a pipe E, which enters the top of said siphon and dips at its other end into said chamber. Said pipes E constitute drain-pipes for the chambers, each chamber being emptied through said pipe and associated siphon in the operation of said siphon, as will hereinafter more fully appear. Connected with each chamber and below the same is a subchamber into which the lower end of the associated pipe E extends. Said extension $D^2$ is adapted to be filled with water to seal the lower open end of the pipe E and is made of a depth somewhat greater than the depth of the seal of the associated siphon, so as to insure a perfect seal at all times in the operation of the apparatus. Each of said bells D' of the chambers or wells D communicates through the medium of a starting-pipe $D^3$ with a siphon associated with another chamber D of the series. As herein shown, each pipe $D^3$ enters one of said siphons below the seal-level in the trap thereof, though it may enter said siphon above said seal-level. Each of said pipes $D^3$ passes upwardly through the open top of the well or chamber D and thence laterally and downwardly toward the siphon with which it communicates.

As herein shown, the drain-pipe E of each siphon communicates with the chamber D next adjacent thereto, the pipe E of siphon No. 1 communicating with No. 1 chamber D, the pipe E of siphon No. 2 communicating with No. 2 chamber D, and so on throughout the series, while the starting-pipe associated with chamber No. 1 communicates with siphon No. 2, the starting-pipe associated with chamber No. 2 communicates with siphon No. 3, and so on. This arrangement, while a preferable one, may be varied—that is to say, the siphon associated with each chamber and through which said chamber is emptied need not necessarily be the siphon next adjacent to such chamber, it only being necessary that the siphon associated with one chamber of the series in a manner to empty said chamber shall communicate with a starting-pipe which is connected with a bell in a chamber associated with another siphon of the series. The term "associated siphon" hereinafter employed in connection with the chambers is understood to mean the siphon which empties the chamber referred to. In the present instance the siphons and chambers are arranged in straight lines, so that the starting-pipe of the chamber No. 4 which communicates with siphon No. 1 must pass from one end of the series to the other. The siphons and associated chambers may be arranged in circular series, in which event the starting-pipes will all be of practically the same length. In the usual working condition of the apparatus three of the chambers D are filled with liquid and one is empty. The traps of all the siphons are also filled, as well as the extension-chambers $D^2$. If it be assumed, for instance, that chambers No. 1, No. 2, and No. 3 be filled and chamber No. 4 be empty, the operation of the apparatus is as follows: The water entering through the pipes A' fills the tank A to or above the level of the tops of the chambers D. The traps at the discharge ends of the siphons are so proportioned with respect to the tank that the maximum liquid-head in said tank is not sufficient in itself to start said siphons into operation. When said tank A has been filled to the level of the tops of said chambers D, a further supply of liquid to the tank overflows into the empty chamber No. 4 and fills or partially fills the same. The filling of said No. 4 chamber D causes the liquid to rise around the bell D' in said chamber, and the liquid enters the lower end of the bell and to an extent displaces the air therein, causing said air to be transferred through the pipe $D^3$ to the trap of siphon No. 1. As the level of the liquid rises in No. 4 chamber D the pressure in the pipe $D^3$ is increased and transmitted to siphon No. 1 until said pressure is sufficient to overcome the seal in the trap of said No. 1 siphon and start said siphon into operation. Said siphon No. 1 continues in operation until the chamber A is emptied of its contents and said contents transferred to the tank or receptacle with which the pipe C communicating with said siphon empties. At the time siphonic operation begins in said siphon No. 1 a suction is produced in said siphon which acts to draw through the drain-pipe E the liquid from the chamber D associated with siphon No. 1, said chamber being emptied to or below the lower end of the bell therein. After said tank has been emptied through siphon No. 1 in the manner described and chamber D No. 1 associated with said siphon emptied (chambers D No. 2, No. 3, and No. 4 being at this time practically filled) said chamber No. 1 will remain empty until the tank A is again filled to the level of the top of said chambers. Thereafter liquid enters said chamber No. 1 and through the bell D' and pipe $D^3$ exerts pressure on siphon No. 2 in the manner hereinbefore described and starts said siphon No. 2 into operation to empty said tank A and the chamber D associated therewith. The several siphons of the series are thus brought successively into action until all of the siphons have been operated and successive charges or "doses" of the liquid discharged therethrough into the several tanks or receptacles communicating with the pipes C, after which such operations will be repeated in the same order so long as liquid is supplied to the tank A.

The lower ends of the pipes $D^3$ at their entrance to the siphon-trap are formed to provide traps in said pipes to prevent the escape of air from said siphons through the chambers D at times when said chambers are not filled. As herein shown, said lower portions of the pipes $D^3$ are inclined downwardly and outwardly from said traps to the vertical parts of the pipes, thereby constituting traps in said pipes between said vertical parts of the pipes and said siphon-traps. Any other familiar form of trap may be employed for this purpose, as found most convenient or desirable. When the level of the liquid has been depressed in the siphon-traps below the level of the entrance of the parts $D^3$ thereinto, the pressure in the siphons acts to drive the liquid in said inclined parts of the pipes backwardly into the vertical parts thereof, and said lower or trap ends of the pipes are made of such length that when the water is driven therefrom into the vertical parts of the pipes it will produce a column which will more than counterbalance the pressure in the siphon due to the liquid-head in the tank A. When the chamber D associated with the pipe $D^3$ which communicates with the siphon next to be brought into operation is filled, the pressure exerted by the water-head in said chamber D acts through the pipe $D^3$ to first drive the liquid from said pipe $D^3$ into the trap of said siphon, and thereafter the continued pressure acting on the water seal in said siphon-trap acts to force said seal and to start said siphon into operation.

The starting-pipes $D^3$ and bells $D'$ are desirably provided with vent-pipes $D^4$, which communicate with the pipes above the bells and extend downwardly and terminate above the upper ends of the bells. Said pipes are provided to insure that the bells and pipes be thoroughly ventilated after each operation of the siphons associated therewith. The lower ends of the said pipes determine the sealing-levels of the several bells.

In Fig. 5 I have shown my invention applied to a double-trap siphon. As shown in said figure, the trap $b^2$ of each siphon is provided with an auxiliary or blow-off trap $B'$, having a less depth of seal than the main trap of said siphon. Said trap consists of a small pipe, which is shown as located outside of the main trap $b^2$, though it may be located within said main trap. One end of said pipe enters the descending part of the trap above the bend thereof and preferably, though not necessarily, below the seal-level therein, and the other end of the pipe enters the outlet or ascending end of the trap, preferably above said seal-level. The starting-pipe $D^3$ associated with each siphon enters said blow-off trap, though, if desired, said starting-pipe may enter directly into the main trap of the siphon. The operation of the apparatus when connected with this form of siphon is the same as that hereinbefore described except that the air-pressure in the starting-pipe forces the seal of the blow-off trap, (it having a less depth of seal than the main trap,) which releases the air in the main trap and starts the siphon into action. An advantage of connecting the starting-pipe with the blow-off trap is that inasmuch as there is a less quantity of water to be displaced to force the seal the chambers and bells D D', respectively, may be made smaller than in the first-mentioned construction.

It is obvious that the invention may be otherwise applied and that the structural details of the apparatus shown may be varied without departing from the spirit of my invention, and I do not wish to be limited to such details except as hereinafter made the subject of specific claims. For instance, the chambers D need not necessarily be located in the tank A, it only being necessary that they communicate with the tank or its source of liquid-supply, so as to be filled when said tank is filled to the required level. Moreover, the relation of the chambers $D^2$, communicating with the chambers D, may be varied so long as the proper communication between the same and said chambers is maintained, so that said chambers are emptied through said drain-pipes.

I claim as my invention—

1. An apparatus for the purpose set forth comprising a liquid tank or receptacle, means acting severally to empty said tank or receptacle comprising siphons located therein, chambers associated with the siphons, and means controlled by the presence of liquid in said chambers, prior to the passage of said liquid through the siphons, for bringing said siphons into operation in a predetermined rotative order.

2. An apparatus for the purpose set forth comprising a tank or receptacle, a plurality of siphons acting severally to empty said tank, a series of chambers which are severally associated with said siphons and filled from the source supplying liquid to the tank, means operated by the filling of each chamber for transmitting pressure to the siphon associated with another chamber of the series to start the same into action, and means for emptying each chamber through the operation of its associated siphon.

3. An apparatus for the purpose set forth comprising a tank or receptacle, a plurality of siphons acting severally to empty said tank, a series of chambers which are severally associated with said siphons and filled from the source supplying liquid to the tank, means operated by the filling of each chamber for transmitting pressure to the siphon associated with another chamber of the series to start the same into action, and means for emptying each chamber through the operation of its associated siphon, the last chamber of the series being connected with the first siphon of the series whereby said siphons may be operated in a predetermined rotative order.

4. An apparatus for the purpose set forth comprising a tank or receptacle, a plurality of siphons acting severally to empty said tank, a series of chambers severally associated with said siphons and located in and filled from said tank, means operated by the filling of each chamber for transmitting pressure to the siphon associated with another chamber of the series and means for emptying each chamber through the operation of its associated siphon.

5. An apparatus for the purpose set forth comprising a tank or receptacle, a plurality of siphons in said tank acting severally to empty said tank, a series of chambers also in said tank which are severally associated with said siphons, means operated by the filling of each chamber for transferring pressure to the siphon associated with another chamber of the series to start the same into operation and means for emptying each chamber through the operation of its associated siphon.

6. An apparatus for the purpose set forth comprising a tank or receptacle, a plurality of siphons acting severally to empty said tank, and provided with trapped discharge ends, a series of chambers severally associated with said siphons, and filled from the source supplying liquid to the tank, a pipe communicating at one end with each siphon and sealed at its lowest part and having open communication at its other end with the chamber associated with one of the other siphons, and means for emptying each chamber through the operation of its associated siphon.

7. An apparatus for the purpose set forth comprising a tank or receptacle, a plurality of siphons acting severally to empty said tank and provided with trapped discharge ends, a series of chambers severally associated with said siphons and filled from the source supplying liquid to said tank, a downwardly-opening bell in each chamber, a pipe connected with each siphon and dipping into its associated chamber, and a pipe communicating at one end with each bell and at its other end with a siphon associated with another chamber of the series, said parts being constructed to empty the chambers below the sealing-levels of the bells.

8. An apparatus for the purpose set forth comprising a tank or receptacle, a plurality of siphons acting severally to empty said tank and provided with trapped discharge ends, a series of chambers severally associated with said siphons, and filled from the source supplying liquid to said tank, a downwardly-opening bell in each chamber, a pipe communicating at one end with each bell, and at its other end with a siphon associated with another chamber of the series, and means for emptying each chamber through the action of its associated siphon below the sealing-level of the bell therein.

9. An apparatus for the purpose set forth comprising a tank or receptacle, a plurality of siphons acting severally to empty said tank and provided with trapped discharge ends, a series of chambers severally associated with said siphons and filled from the source supplying liquid to said tank, a downwardly-opening bell in each chamber, a pipe connected with each siphon and dipping into its associated chamber, a pipe communicating at one end with each bell and at its other end with a siphon associated with another chamber of the series, and a vent-pipe communicating with each of the last-mentioned pipes above the bell thereof and extending downwardly with its lower open end above the lower end of said bell.

10. An apparatus for the purpose set forth comprising a tank or receptacle, a plurality of siphons acting severally to empty said tank and provided with trapped discharge ends, a series of chambers severally associated with said siphons and filled from the source supplying liquid to the tank, means operated by the filling of each chamber for transmitting pressure to the siphon associated with another chamber of the series, an emptying-pipe communicating at one end with each siphon and dipping into its associated chamber and means for maintaining said emptying-pipes constantly sealed.

11. An apparatus for the purpose set forth comprising a tank or receptacle, a plurality of siphons acting severally to empty said tank and provided with sealed discharge ends, a series of chambers which are severally associated with said siphons and filled from the source supplying liquid to said tank, a pipe communicating at one end with each siphon and sealed at its lowest part and communicating at its other end with the chamber associated with another one of the siphons, whereby the rise of liquid in said chamber communicates pressure through said pipe to said siphon, an emptying-pipe communicating with each of the siphons and dipping into its associated chamber for emptying the latter through said pipe and associated siphon, and means for maintaining constantly sealed the lower ends of said emptying-pipes.

12. An apparatus for the purpose set forth comprising a tank or receptacle, a plurality of siphons acting severally to empty said tank and provided with trapped discharge ends and also with blow-off traps communicating with said discharge ends, a series of chambers severally associated with said siphons and filled from the source supplying liquid to said tank, a downwardly-opening bell in each chamber, an emptying-pipe connected with each siphon and dipping into its associated chamber, and a pipe communicating at one end with each bell and at its other end with the blow-off pipe of a siphon associated with another chamber.

In testimony that I claim the foregoing as my invention I affix my signature, in presence of two witnesses, this 17th day of December, A. D. 1901.

SIDNEY W. MILLER.

Witnesses:
   WILLIAM L. HALL,
   GERTRUDE BRYCE.